United States Patent
Miyazaki

(10) Patent No.: US 9,164,520 B2
(45) Date of Patent: Oct. 20, 2015

(54) SYNCHRONOUS RECTIFICATION TYPE POWER CIRCUIT AND METHOD OF ADJUSTING THE SAME

(71) Applicant: Kabushiki Kaisha Toshiba, Minato-ku, Tokyo (JP)

(72) Inventor: Takayuki Miyazaki, Tokyo (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 241 days.

(21) Appl. No.: 13/782,689

(22) Filed: Mar. 1, 2013

(65) Prior Publication Data

US 2014/0028270 A1    Jan. 30, 2014

(30) Foreign Application Priority Data

Jul. 27, 2012    (JP) .................................. 2012-167321

(51) Int. Cl.
     *G05F 1/10*      (2006.01)
     *H02M 3/158*    (2006.01)

(52) U.S. Cl.
     CPC ............... *G05F 1/10* (2013.01); *H02M 3/1588* (2013.01); *Y02B 70/1466* (2013.01)

(58) Field of Classification Search
None
See application file for complete search history.

(56) References Cited

U.S. PATENT DOCUMENTS

| | | | |
|---|---|---|---|
| 5,067,111 A * | 11/1991 | Asano et al. ............. 365/189.08 |
| 6,894,465 B2 | 5/2005 | Sutardja et al. | |
| 7,872,461 B2 | 1/2011 | Yamada | |
| 2003/0080784 A1* | 5/2003 | Horie et al. ...................... 327/50 |
| 2003/0231010 A1* | 12/2003 | Sase et al. ...................... 323/282 |
| 2006/0113980 A1* | 6/2006 | Yoshida ........................ 323/282 |
| 2009/0146631 A1* | 6/2009 | Fukumori ..................... 323/284 |
| 2011/0121804 A1* | 5/2011 | Kudo ............................ 323/282 |
| 2012/0033459 A1 | 2/2012 | Chang et al. | |
| 2013/0162230 A1* | 6/2013 | Miyamae ...................... 323/271 |
| 2013/0169247 A1* | 7/2013 | Onouchi et al. .............. 323/269 |

FOREIGN PATENT DOCUMENTS

JP      2005-533471 A      11/2005
JP      2006211760 A *    8/2006

(Continued)

OTHER PUBLICATIONS

Japanese Office Action (and English translation thereof) dated Jun. 23, 2015, issued in counterpart Japanese Application No. 2012-167321.

*Primary Examiner* — Timothy J Dole
*Assistant Examiner* — Monica Mata
(74) *Attorney, Agent, or Firm* — Holtz, Holtz, Goodman & Chick PC

(57) ABSTRACT

According to one embodiment, a synchronous rectification type power circuit includes a first power terminal to which a voltage on a high potential side is supplied, a second power terminal to which a voltage on a low potential side is supplied, an output terminal that outputs an output voltage to a load having an inductance and a capacitor, a first switch unit connected between the first power terminal and the output terminal, a second switch unit connected between the second power terminal and the output terminal, a control signal generating circuit which controls ON/OFF of the first and second switch units, and a control circuit that compares the output voltage with a predetermined reference voltage for a predetermined period when the second switch unit is turned OFF. A timing for turning OFF the second switch unit is adjusted based on a result of the comparison.

20 Claims, 12 Drawing Sheets

(56) References Cited

FOREIGN PATENT DOCUMENTS

| JP | 2009-290986 A | 12/2009 |
| JP | 2010-268535 A | 11/2010 |
| JP | 2012-039844 A | 2/2012 |
| WO | WO 2004/006037 A2 | 1/2004 |

* cited by examiner

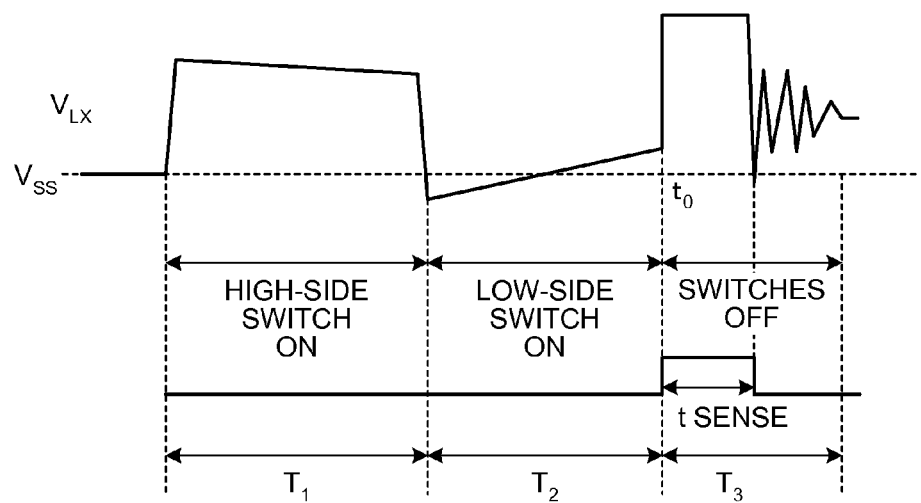
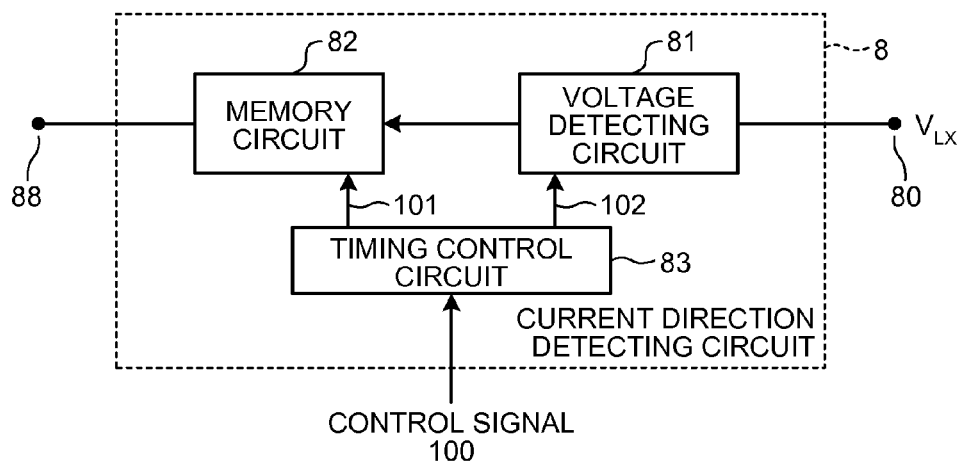

SYNCHRONOUS RECTIFICATION TYPE POWER CIRCUIT AND METHOD OF ADJUSTING THE SAME

CROSS-REFERENCE TO RELATED APPLICATIONS

This application is based upon and claims the benefit of priority from Japanese Patent Application No. 2012-167321, filed on Jul. 27, 2012; the entire contents of which are incorporated herein by reference.

FIELD

Embodiments described herein relate to a synchronous rectification type power circuit to be operated in a discontinuous conduction mode and a method of adjusting the same.

BACKGROUND

As illustrated in FIG. 23, a synchronous rectification type power circuit includes a high-side switch (101) for supplying a voltage (Vdd) on a high potential side to an output terminal (103) and a low-side switch (102) for supplying a voltage (Vss) on a low potential side to the output terminal (103), and these switches are alternately turned ON/OFF to output a desirable voltage to the output terminal (103). An output inductor (106) and an output capacitance (107) are connected to the output terminal (103). In order to prevent an inductor current (IL) from flowing reversely to the low potential side in a light load, resulting in a reduction in an efficiency, there is a DCM mode (Discontinuous Conduction Mode) for turning OFF the low-side switch (102) to provide a period in which both of the switches are turned OFF. An optimum control in the DCM mode, that is, a timing for turning OFF the low-side switch (102) is equivalent to a moment that the inductor current (IL) reaches zero. For this reason, there are proposed various control methods for turning OFF the low-side switch (102) in an optimum timing. In an output voltage of the output terminal (103), ringing is generated by a parasitic capacitance possessed by an inductor or the like after the low-side switch (102) is turned OFF and an output current then reaches zero. There is also a possibility that the voltage influenced by the ringing might exceed a power supply voltage depending on an input/output voltage or a characteristic of the inductor. For this reason, a countermeasure against the ringing of the output voltage is required for the control in the DCM mode, which is not sufficient.

BRIEF DESCRIPTION OF THE DRAWINGS

FIG. 3 is a chart illustrating a relationship between an output voltage and the operating period (tSENSE) of the current direction detecting circuit, in the case in which the timing for turning OFF the low-side switch is excessively late;

FIG. 4 is a block diagram illustrating a configuration of the current direction detecting circuit;

DETAILED DESCRIPTION

In general, according to one embodiment, a synchronous rectification type power circuit includes a first power terminal to which a voltage on a high potential side is supplied, a second power terminal to which a voltage on a low potential side is supplied, an output terminal that outputs an output voltage to a load having an inductor and a capacitor, a first switch unit connected between the first power terminal and the output terminal, a second switch unit connected between the second power terminal and the output terminal, a control signal generating circuit which controls ON/OFF of the first and second switch units, and a control circuit that compares the output voltage with a predetermined reference voltage for a predetermined period when the second switch unit is turned OFF. A timing for turning OFF the second switch unit is adjusted based on a result of the comparison.

Exemplary embodiments of synchronous rectification type power circuits will be explained below in detail with reference to the accompanying drawings. The present invention is not limited to the following embodiments.

Figure 1:
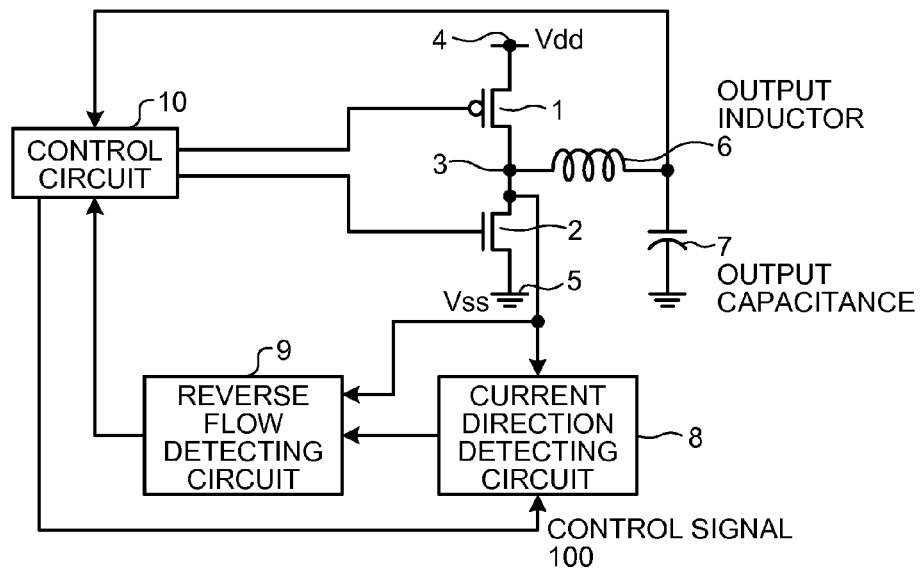
FIG. 1 is a diagram illustrating a synchronous rectification type power circuit according to a first embodiment.

FIG. 1 is a circuit diagram illustrating a synchronous rectification type power circuit according to a first embodiment. A P-type MOS transistor constituting a high-side switch (1) is connected between a power terminal (4) to which a voltage (Vdd) on a high potential side is to be applied and an output terminal (3), and an N-type MOS transistor constituting a low-side switch (2) is connected between a power terminal (5) to which a voltage (Vss) on a low potential side is to be applied and the output terminal (3). An output inductor (6) and an output capacitance (7) are connected to the output terminal (3). A control circuit (10) supplies a control signal for alternately turning ON/OFF the high-side switch (1) and the low-side switch (2) to gates of the respective MOS transistors. A voltage of connecting terminal of the output inductor (6) and the output capacitance (7) is fed back to the control circuit (10). A voltage of the output terminal (3) is applied to a current direction detecting circuit (8), and the voltage of the output terminal (3) and an output of the current direction detecting circuit (8) are supplied to a reverse flow detecting circuit (9). A control signal (100) for controlling an operation timing of the current direction detecting circuit (8) is supplied from the control circuit (10) to the current direction detecting circuit (8). The output of the current direction detecting circuit (8) is supplied to the reverse flow detecting circuit (9). Depending on the output of the current direction detecting circuit (8), a threshold of the reverse flow detecting circuit (9) is adjusted. The reverse flow detecting circuit (9) supplies, to the control circuit (10), a predetermined output signal for controlling a timing for turning OFF the low-side switch (2) when the voltage of the output terminal (3) exceeds the threshold. By adjusting the threshold of the reverse flow detecting circuit (9), the timing for turning OFF the low-side switch (2) through the control circuit (10) is regulated.

A relationship between the operation timing of the current direction detecting circuit (8) and an output voltage will be described below with reference to FIGS. 2 and 3.

Figure 2:
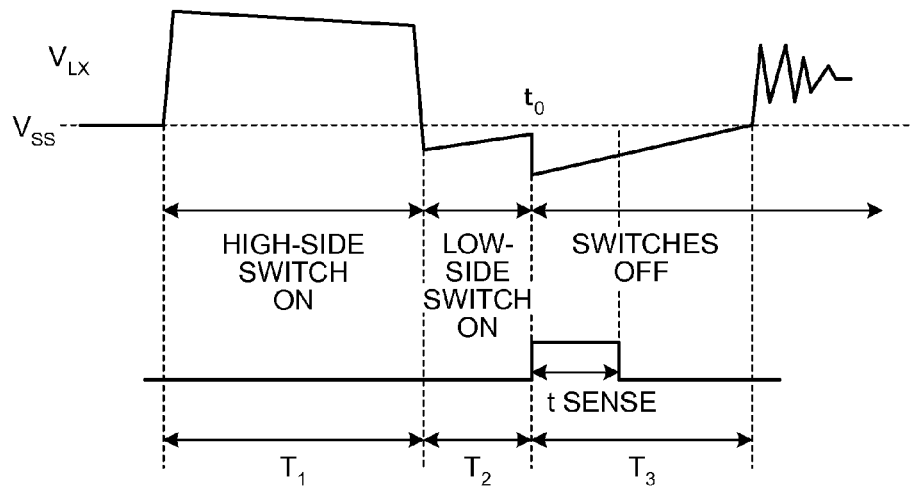
FIG. 2 is a chart illustrating a relationship between an output voltage and an operating period (tSENSE) of a current direction detecting circuit, in the case in which a timing for turning OFF a low-side switch is excessively early.

FIG. 2 is a chart for explaining an output voltage (VLX) of the synchronous rectification type power circuit and a detection timing of the current direction detecting circuit (8). In FIG. 2, a time (T1) indicates a time that the high-side switch (1) is to be turned ON and a time (T2) indicates a time that the low-side switch (2) is to be turned ON. At a timing (t0), the low-side switch (2) is turned OFF. The current direction detecting circuit (8) starts to detect the output voltage (VLX) immediately after the low-side switch (2) is turned OFF. In order to avoid the influence of a noise made by turning OFF the low-side switch (2), it is also possible to provide a predetermined non-detection period (tBLANK). The non-detection period (tBLANK) is set to be equal to or greater than 0 µs). After the non-detection period (tBLANK), a detecting operation period (tSENSE) of the current direction detecting circuit (8) is started. By detecting whether the output voltage (VLX) exceeds a predetermined reference voltage (VREF) for a period of the detecting operation period (tSENSE) or not, it is possible to detect whether the timing for turning OFF the low-side switch (2) is excessively early/late or not.

An example of FIG. 2 represents the case in which the reference voltage (VREF) to be supplied to the current direction detecting circuit (8) is set to be the power supply voltage (Vss) on the low-potential side. In the example illustrated in FIG. 2, it is indicated that the timing for turning OFF the low-side switch (2) is excessively early because the output voltage (VLX) is lower than a reference voltage (Vss) for the detecting operation period (tSENSE). Accordingly, a control is carried out by the control circuit (10) in order to delay the timing for a next OFF operation of the low-side switch (2).

FIG. 3 is another chart for explaining the output voltage (VLX) of the synchronous rectification type power circuit and the detection timing of the current direction detecting circuit (8). In FIG. 3, a time (T1) indicates a duration for which the high-side switch (1) is ON and a time (T2) indicates a duration for which the low-side switch (2) is ON. At a timing (t0), the low-side switch (2) is turned OFF. When the low-side switch (2) is turned OFF in a state in which an inductor current flows from the output inductor (6) to the power supply (Vss) on the low potential side, the output voltage (VLX) is higher than the power supply voltage (Vdd) on the high potential side. FIG. 3 illustrates the state and indicates that the timing for turning OFF the low-side switch (2) is excessively late. Accordingly, the control is carried out by the control circuit (10) in order to quicken the timing for turning OFF the low-side switch (2) at a next time.

As illustrated in FIGS. 2 and 3, in the case in which the inductor current is decreased to reach zero in a state in which the low-side switch (2) is OFF, ringing is generated in the output voltage (VLX). This is generated irrespective of a direction of the current. A duration of the detecting operation period (tSENSE) is adjusted into a period based on the generation of the ringing. In other words, also in the case in which the ringing is generated immediately after the detecting operation period (tSENSE) is started, at least a period corresponding to one cycle of the generated ringing or more is maintained as the detecting operation period (tSENSE) in order to reliably detect the ringing. By detecting one period or more, it is possible to detect both the cases in which the voltage is raised and dropped by the ringing. Therefore, it is possible to prevent an erroneous detection due to the ringing. The ringing is an inherent phenomenon for each circuit which is generated at a resonant frequency determined by the output inductor (6), a parasitic capacitance of the output terminal (3), a parasitic capacitance of a switch or the like. In order to set the detecting operation period (tSENSE), accordingly, it is possible to set a proper detecting operation period by generating the ringing on a test basis to detect one cycle thereof (subsequently, tRINGING). A lower limit of the duration of the detecting operation period (tSENSE) is a period for one cycle of the ringing that is, tRINGING≤tSENSE.

An upper limit of the duration of the detecting operation period (tSENSE) is determined as a range for reducing a power loss caused by the excessively early control of the low-side switch (2) into a predetermined scope, for example, 10% or less. An energy Eloss which is lost due to the excessively early timing for turning OFF the low-side switch (2) is expressed in Equation (1).

[Equation 1]

$$Eloss = Vrev \times \frac{Vrev}{L} \times \frac{tSENSE}{2} \times tSENSE \quad (1)$$

In the Equation (1), Vrev represents a value determined by a forward voltage of a parasitic diode, a forward voltage of a protection diode connected in parallel with the low-side switch (2), a voltage generated between a source and a drain in an MOS transistor or the like when the low-side switch (2)

is the MOS transistor, and is the forward voltage of the parasitic diode in a general structure, that is, approximately 0.7 V. L represents an inductance of the output inductor.

An energy Esent sent to the output for a period in which the low-side switch (2) is ON can be expressed in Equation (2).

[Equation 2]

$$Esent = VOUT \times \frac{VOUT}{L} \times \frac{tNON}{2} \times tNON \quad (2)$$

In the Equation (2), VOUT represents an output voltage and tNON represents an ON time in a DCM operation of the low-side switch (2) which have values determined if a control method is decided. In general uses, VOUT>Vrev is set. If VOUT=Vrev is set in the meaning for obtaining the worst value, however, a ratio of the lost energy Eloss to an energy Esent to be sent is expressed in Equation (3).

[Equation 3]

$$\frac{Eloss}{Esent} = \frac{tSENSE}{tNON} \times \frac{tSENSE}{tNON} \quad (3)$$

In order to cause a lost power to be equal to or smaller than 1/10 of an output power, it is preferable that the detecting time (tSENSE) should be equal to or smaller than a period achieved by dividing the duration (tNON), for which the low-side switch (2) is ON, by a square route of ten. In other words, it is preferable that a relationship between the detecting operation time (tSENSE) and the duration (tNON) for which the low-side switch is ON should be set into Equation (4).

[Equation 4]

$$tSENSE \leq \frac{tNON}{\sqrt{10}} \quad (4)$$

Accordingly, the detecting operation time (tSENSE) is set as a duration of the following Equation (5).

[Equation 5]

$$tRINGING \leq tSENSE \leq \frac{tNON}{\sqrt{10}} \quad (5)$$

By supplying the control signal (100) having the relationship of the Equation (5) from the control circuit (100) to the current direction detecting circuit (8) to control the detecting operation time (tSENSE), it is possible to carry out a desirable detecting operation.

FIG. 4 is a block diagram illustrating a structure of the current direction detecting circuit (8). The current direction detecting circuit (8) includes a voltage detecting circuit (81), a memory circuit (82) and a timing control circuit (83). The output voltage (VLX) is supplied to an input terminal (80) of the voltage detecting circuit (81). Upon receipt of the control signal (100) from the control circuit (10) illustrated in FIG. 1, the timing control circuit (83) generates timing control signals (101) and (102) in order to carry out the detecting operation for the predetermined detecting operation period (tSENSE). The timing control circuit (83) controls the voltage detecting circuit (8), the memory circuit (82) or both of them, thereby suppressing an unnecessary detecting operation for a period other than the predetermined detecting operation period (tSENSE). An output of the current direction detecting circuit (8) is supplied from an output terminal (88) to the reverse flow detecting circuit (9). The voltage detecting circuit (81) compares the output voltage (VLX) with the predetermined reference voltage (VREF). A result of the detection obtained by the voltage detecting circuit (81) indicates a result of the output voltage (VLX) which is higher or lower than the predetermined reference voltage (VREF) and corresponds to the timing for turning OFF the low-side switch (2) which is excessively late/early. The result of the detection obtained by the voltage detecting circuit (81) is supplied to the memory circuit (82).

The memory circuit (82) stores an output of the voltage detecting circuit (81) in relation to the control of the timing for turning OFF the low-side switch (2). For example, the memory circuit (82) can also be constituted as an analog memory circuit using a capacitor (not illustrated). In this case, the capacitor is charged/discharged depending on whether the output of the voltage detecting circuit (81) has a high level (H)/a low level (L) and the storage is performed depending on a change in the voltage. The memory circuit (82) can also be constituted as a digital circuit. For example, it is possible to use an SR latch circuit or the like. The output of the voltage detecting circuit (81) is supplied to a set input of the SR latch circuit (not illustrated) and a timing control signal (101) sent from the timing control circuit (83) is supplied as a reset input.

Figure 5:
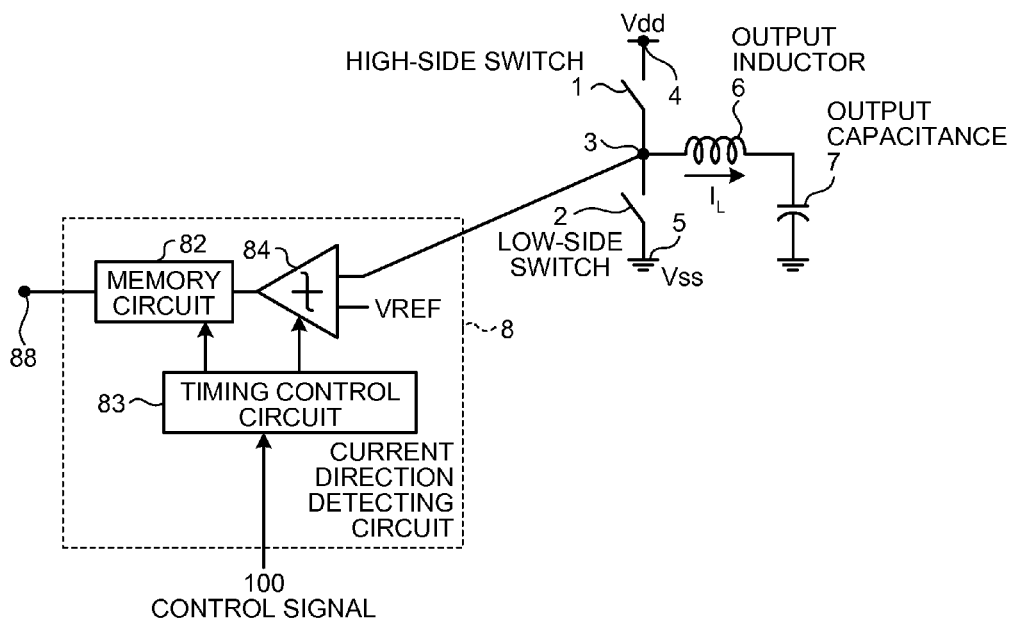
FIG. 5 is a diagram illustrating a structure in the case in which a comparator is used for a voltage detecting circuit of the current direction detecting circuit.

FIG. 5 illustrates an example of the case in which a comparator (84) is used as the voltage detecting circuit (81) of the current direction detecting circuit (8). One of input terminals of the comparator (84) is connected to the output terminal (3) and receives the output voltage (VLX). The reference voltage (VREF) is supplied to the other input. It is possible to decide whether the timing for turning OFF the low-side switch (2) is excessively late or early by comparing the output voltage (VLX) after turning OFF the low-side switch (2) with the reference voltage (VREF). A proper voltage is selected as the reference voltage (VREF), depending on a characteristic of a switch to be used or an inductor to be connected.

The timing control circuit (83) operates the voltage detection for only the predetermined detecting operation period (tSENSE), thereby enabling a prevention of an erroneous detection and a reduction in a consumed current for a period other than the detecting operation period (tSENSE). For example, by operating a current source (not illustrated) of the comparator (84) for only the detecting operation period (tSENSE), it is possible to reduce the consumed current. Moreover, it is also possible to employ a structure in which a gate circuit (not illustrated) is provided between the comparator (84) and the memory circuit (82) and a gate circuit is controlled with a control signal of the timing control circuit (83) so that the output of the comparator (84) is supplied to the memory circuit (82) for only the detecting operation period (tSENSE).

Figure 6:
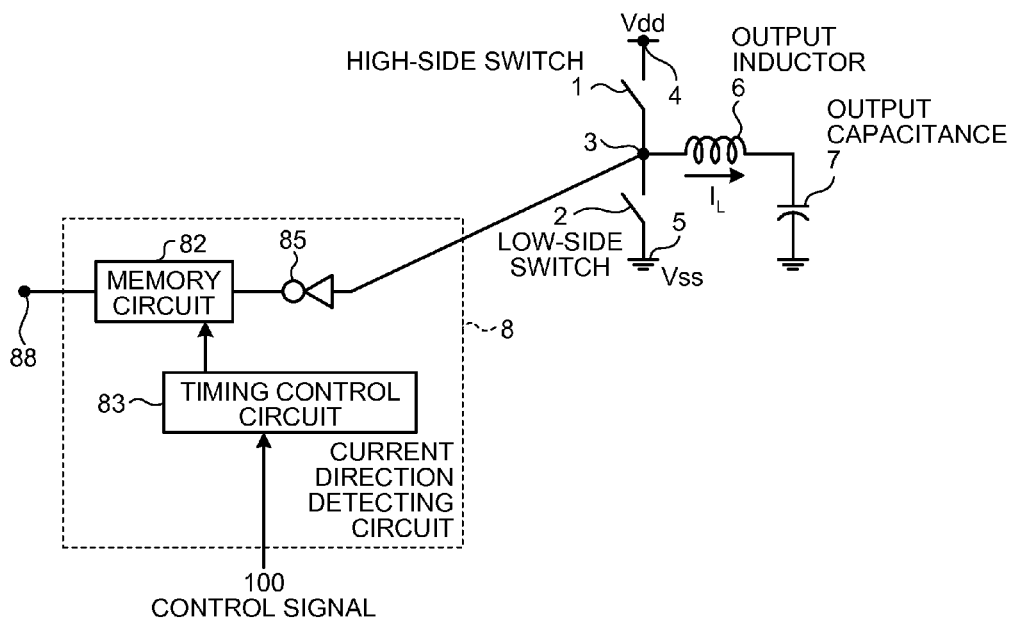
FIG. 6 is a diagram illustrating a structure in the case in which an inverter is used for the voltage detecting circuit of the current direction detecting circuit.

FIG. 6 illustrates an example in which a CMOS inverter (85) is used as the voltage detecting circuit (81). By using a CMOS inverter, the output voltage (VLX) can be compared with an intermediate voltage between the power supply voltage (Vdd) on the high potential side and the power supply voltage (Vss) on the low potential side, that is, (Vdd−Vss)/2. With the structure, it is possible to detect the output voltage (VLX) without using a comparator having a large chip area or consumed power. In the case in which the CMOS inverter is used, a through current is generated when the output voltage (VLX) reaches the intermediate voltage of the power supply voltage, that is, (Vdd−Vss)/2. It is possible to limit the through current by reducing a W/L ratio of an MOS transistor constituting the CMOS inverter to restrict an ON-state current. In the case in which the voltage detecting circuit is set to be the CMOS inverter, an output of the CMOS inverter is supplied to the memory circuit (82) through a gate circuit (not illustrated) in order to cause the CMOS inverter to function as the voltage detecting circuit for only the predetermined period (tSENSE) and an operating period of a gate circuit is controlled by the timing control circuit (83) so as to be the predetermined detecting operation time (tSENSE).

Figure 7:
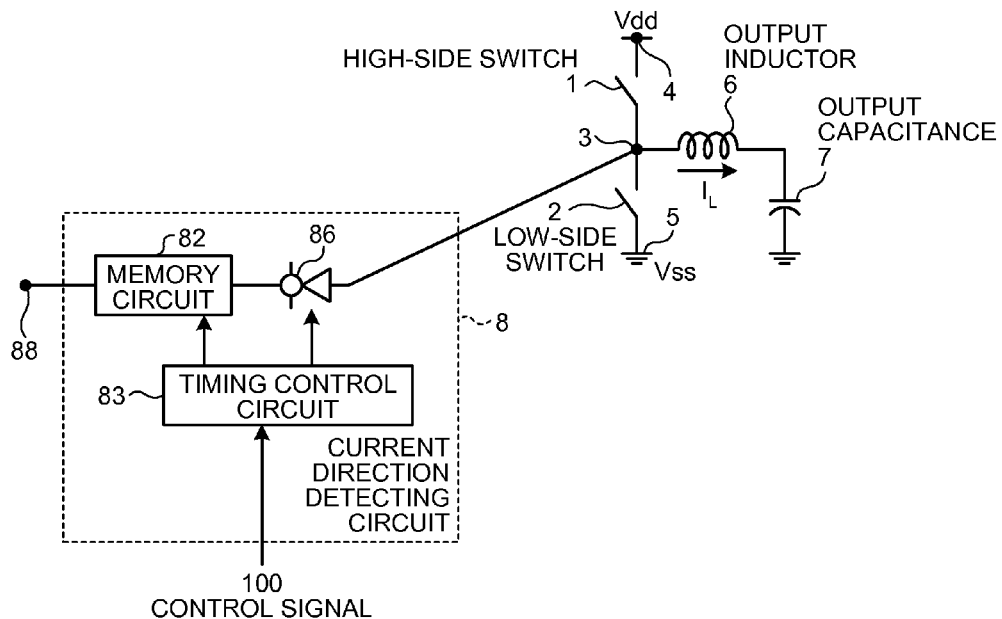
FIG. 7 is a diagram illustrating a structure in the case in which a clocked inverter is used for the voltage detecting circuit of the current direction detecting circuit.

FIG. 7 illustrates an example in which a clocked inverter circuit (86) is used as the voltage detecting circuit (81). Also in this case, the output voltage (VLX) is compared with the intermediate voltage between the power supply voltage (Vdd) on the high potential side and the power supply voltage (Vss) on the low potential side, that is, the voltage of (Vdd−Vss)/2. By supplying a driving clock of the clocked inverter circuit (86) for only the predetermined detecting operation time (tSENSE) after turning OFF the low-side switch (2) through the timing control circuit (83), it is possible to operate the clocked inverter circuit (86) as the voltage detecting circuit to be operated for only the detecting operation time (tSENSE).

Moreover, it is also possible to use an NAND circuit or an NOR circuit which has a CMOS structure in place of the inverter. In this case, an output voltage and an enable signal are supplied as respective input signals. The NAND circuit or NOR circuit can be operated as the voltage detecting circuit for comparing the output voltage (VLX) with the intermediate voltage between the power supply voltage (Vdd) on the high potential side and the power supply voltage (Vss) on the low potential side, that is, the voltage of (Vdd−Vss)/2 for the period in which the enable signal is supplied. By supplying the enable signal for only the predetermined detecting operation period (tSENSE) after the low-side switch is turned OFF through the timing control circuit (83), it is possible to use the NAND circuit or the NOR circuit as the voltage detecting circuit to be operated for only the detecting operation period (tSENSE).

Figure 8:
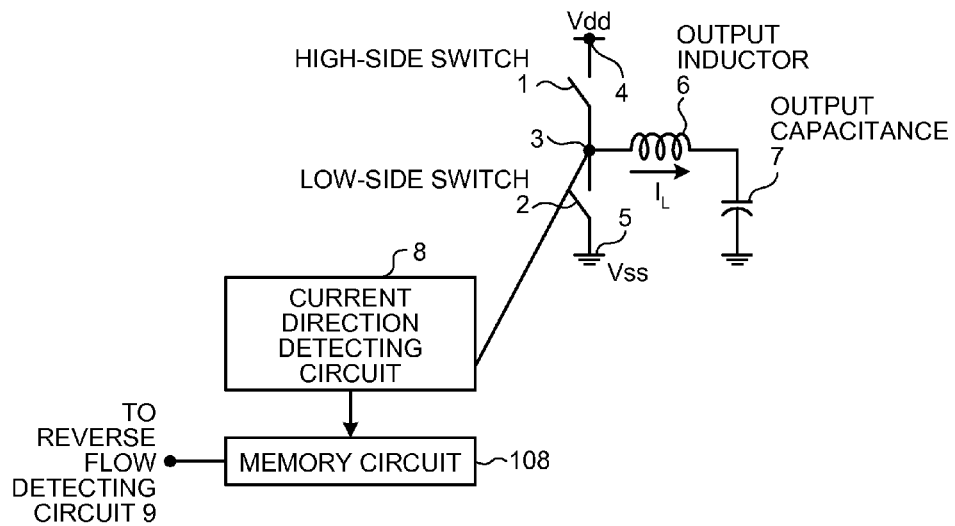
FIG. 8 is a diagram illustrating a structure in the case in which there is provided a memory circuit for storing an output of the current direction detecting circuit.

FIG. 8 is a diagram illustrating a structure including a memory circuit (108) for storing the output of the current direction detecting circuit (8). In the case in which the current direction detecting circuit (8) detects that the output voltage (VLX) once exceeds the predetermined reference voltage (VREF) for the detecting operation period (tSENSE) of the current direction detecting circuit (8), the result is stored in the memory circuit (108). Information about the memory circuit (108) is held till a next detecting operation period (tSENSE) of the current direction detecting circuit. Accordingly, the information is not influenced by ringing of an output voltage which is generated after the detecting operation period (tSENSE) of the current direction detecting circuit (8). On the other hand, in the case in which the ringing is generated in the output voltage for the detecting operation period (tSENSE) so that the predetermined reference voltage (VREF) is exceeded, it is detected that a timing for causing an inductor current to be zero is present for the detecting operation period (tSENSE) and a result of the detection is stored in the memory circuit (108). An output of the memory circuit (108) is supplied to the reverse flow detecting circuit (9).

Figure 9:
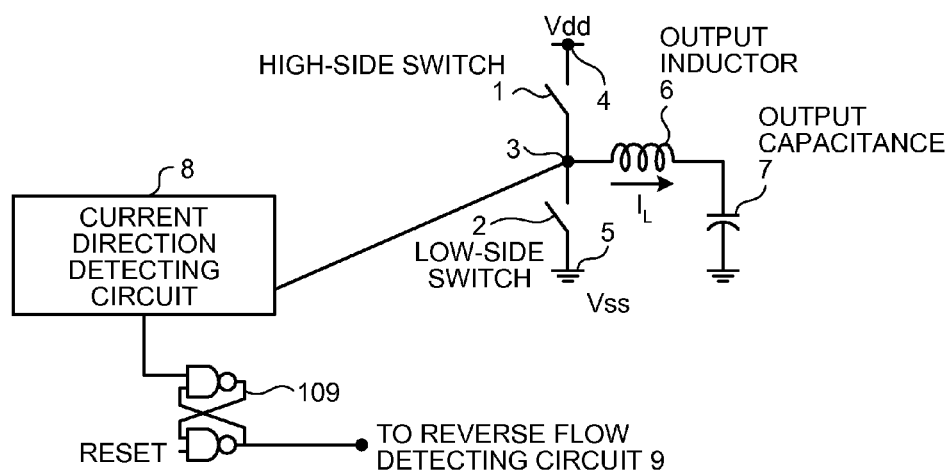
FIG. 9 is a diagram illustrating a structure in the case in which a flip-flop circuit is used as the memory circuit for storing an output of the current direction detecting circuit.

FIG. 9 is a diagram illustrating an example in which an SR latch circuit (109) is used as a memory circuit for storing the output of the current direction detecting circuit (8). The output of the current direction detecting circuit (8) is supplied to a set input terminal of the SR latch circuit (9) and a signal synchronized with a timing for turning ON the high-side switch (1) is supplied from the control circuit (10) to a reset input of the SR latch circuit (109), for example. Consequently, the output of the SR latch circuit (109) is held till the timing for turning ON the high-side switch (1). Thus, it is possible to prevent the influence of ringing generated in the output voltage (VLX) for a period other than the detecting operation period (tSENSE).

Figure 10:
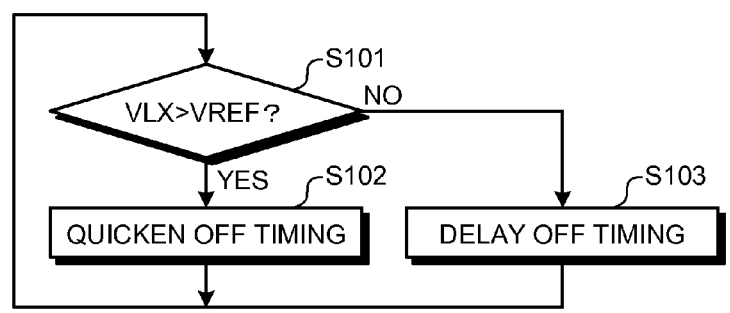
FIG. 10 is a flow chart illustrating a procedure for adjusting the timing for turning OFF the low-side switch.

FIG. 10 is a flow chart illustrating specific steps for optimizing the timing for turning OFF the low-side switch (2). First of all, the output voltage (VLX) is compared with the predetermined reference voltage (VREF) (Step S101). If the output voltage (VLX) is higher than the reference voltage (VREF), there is carried out a control for quickening the timing for turning OFF the low-side switch (2) (Step S102). To the contrary, if the output voltage (VLX) is not higher than the reference voltage (VREF), the timing for turning OFF the low-side switch (2) is delayed (Step S103).

The timing for turning OFF the low-side switch (2) can be regulated by an adjustment of the threshold of the reverse flow detecting circuit (9).

Figure 11:
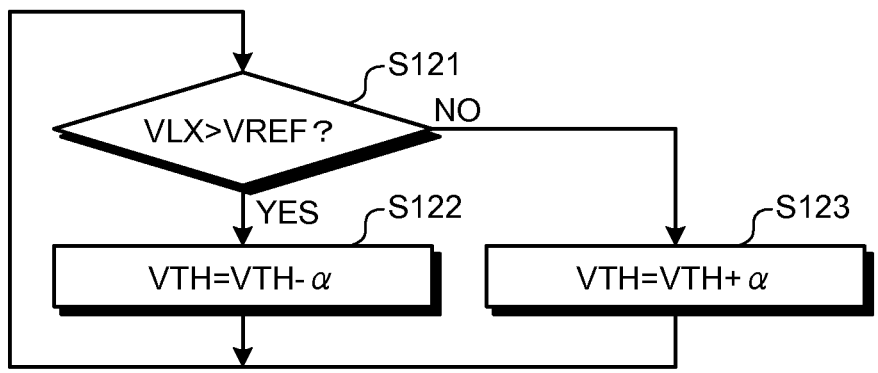
FIG. 11 is a flow chart illustrating the procedure for adjusting the timing for turning OFF the low-side switch based on a relationship with an adjustment of a circuit threshold.

FIG. 11 represents a replacement, with a relationship with the threshold of the reverse flow detecting circuit (9), of the step of controlling the timing for turning OFF the low-side switch (2) illustrated in FIG. 10. In other words, there is carried out an adjustment for decreasing the threshold of the reverse flow detecting circuit (9) in order to quicken the timing for turning OFF the low-side switch (2), and to the contrary, for increasing the threshold of the reverse flow detecting circuit (9) in order to delay the timing for turning OFF the low-side switch (2). By the repetition of the step, the timing for turning OFF the low-side switch (2) is optimized.

Next, description will be given to a specific example of a fine width α of the threshold of the reverse flow detecting circuit (9). An output voltage (VOUT) applied immediately after the low-side switch (2) is represented by VLXmin. In the case in which an N-type MOS transistor is used as the low-side switch (2), it is preferable that the fine width α should have a relationship of Equation (6) in order to set a reduction in an efficiency caused by a non-optimization of the timing for turning OFF the low-side switch (2) to be less than 10% on the assumption that the output voltage (VOUT) is higher than a forward voltage of a parasitic diode in the N-type MOS transistor.

[Equation 6]

$$\alpha < \frac{(VLX \text{ min} - Vss)}{\sqrt{10}} \quad (6)$$

It is preferable that the threshold of the reverse flow detecting circuit (9) should be changed in the fine width α expressed in the Equation (6) every switching cycle of the synchronous rectification type power circuit. The fine width α does not need to be constant. In other words, an adjustable range for a first time and an adjustable range for a second time and subsequent times may be different from each other. By the repetition of the adjustment, the closest threshold to an optimum value is finally reached.

By reducing the fine width α, it is possible to enhance an efficiency of the threshold control of the reverse flow detecting circuit (9). In this case, it is preferable to change the threshold of the reverse current detecting circuit (9) with the fine width α every switching cycle of the synchronous rectification type power circuit. In order to decrease the number of cycles for adjusting the voltage detecting level of the reverse flow detecting circuit (9), the threshold of the reverse flow detecting circuit (9) is adjusted by $2^n \times \alpha$ in the adjustment for the first time. In the case in which the adjustment is found to be excessive, the threshold is set to be $2^{n-1} \times \alpha$ in the adjustment for the second time. If the adjustment is insufficient, the adjustable range for the second time is further adjusted by $2^{n-1} \times \alpha$ and is thus set to be $(2^n + 2^{n-1}) \times \alpha$.

Figure 12:
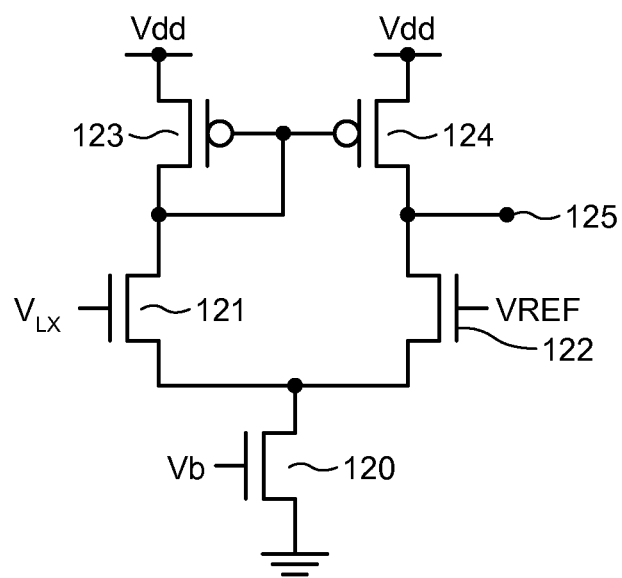
FIG. 12 is a diagram illustrating a structure of a general comparator to be used for a reverse flow detecting circuit.

FIG. 12 is a circuit diagram illustrating a general structure in the case in which a comparator capable of being used as the reverse flow detecting circuit (9) is set to be a differential amplifier. There are provided an N-type MOS transistor (121) for receiving the output voltage (VLX) as an input, an N-type MOS transistor (122) for receiving the predetermined reference voltage (VREF) to a gate, an N-type MOS transistor (120) constituting a current source, and P-type MOS transistors (123) and (124) to be loads. The voltage (Vdd) on the high potential side is supplied to sources of the P-type MOS transistors (123) and (124). The power supply voltage (Vss) on the low potential side is supplied to a source of the N-type MOS transistor (120) constituting the current source, and a bias voltage (Vb) is supplied to a gate thereof. The output voltage is output from a drain of the P-type MOS transistor (124).

In the case in which the comparator is the differential amplifier illustrated in FIG. 12, a method of adjusting a threshold includes a method of varying sizes of the input transistors (121) and (122). More specifically, a plurality of divided transistors connected in parallel is prepared as the input transistor (121), and the number of the transistors to be used is adjusted to enable a regulation of an apparent size of the transistors. By regulating the sizes of the load transistors (123) and (124) to vary a ratio of currents flowing to both of the transistors, alternatively, it is also possible to regulate the level of the output voltage of the output terminal (125), thereby adjusting the threshold of the comparator.

Figure 13:
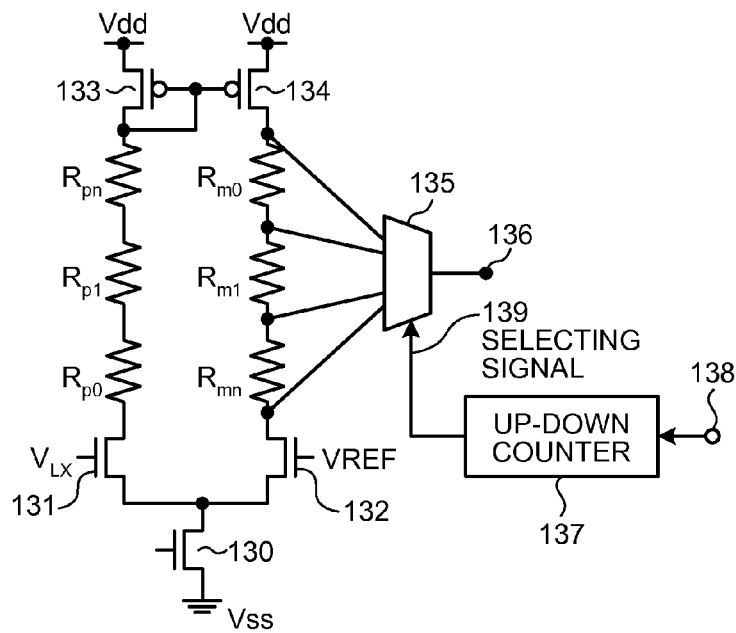
FIG. 13 is a diagram illustrating a first method of adjusting a threshold of the comparator.

FIG. 13 is a diagram illustrating a method of connecting resistors (Rp0) to (Rpn) and resistors (Rm0) to (Rmn) between drains of input transistors (131) and (132) and load transistors (133) and (134) in the differential amplifier constituting the comparator and adjusting a threshold depending on any of the resistors from which an output voltage is to be fetched through a connecting terminal. In other words, the resistors (Rm0) to (Rmn) connected to the transistor (134) on an output side are provided with a plurality of output taps, and outputs thereof are supplied to a multiplexer (135). The multiplexer (135) sends, from an output terminal (136), a predetermined output selected in accordance with a selecting signal (139). The selecting signal (139) is obtained in response to a signal for quickening/delaying the timing for turning OFF the low-side switch (2) which is sent from the current direction detecting circuit (8). The output of the current direction detecting circuit (8) is supplied to a terminal (138) and data of an up-down counter (137) are changed correspondingly so that an output of the up-down counter (137) is supplied as the selecting signal (139) to the multiplexer (135). In the case in which the timing for turning OFF the low-side switch (2) is quickened, the selecting signal (139) for selecting the output of the multiplexer is supplied to decrease the threshold of the differential amplifier. To the contrary, in the case in which the timing for turning OFF the low-side switch (2) is delayed, the selecting signal (139) for selecting the output of the multiplexer (135) is supplied to increase the threshold of the differential amplifier.

Moreover, it is also possible to have a structure in which a P-type MOS transistor and an N-type MOS transistor in an MOS transistor constituting the differential amplifier are replaced with the N-type MOS transistor and the P-type MOS transistor, respectively.

By employing a structure in which the differential amplifiers constituting the comparator are connected in a multi-stage to set a differential output in a first stage to be an input of the differential amplifier in a second stage and adjusting the threshold of the differential amplifier in the first stage through the regulation of the transistor size or with a structure including a resistor and a tap, furthermore, it is also possible to adjust the threshold of the comparator as a whole.

Figure 14:
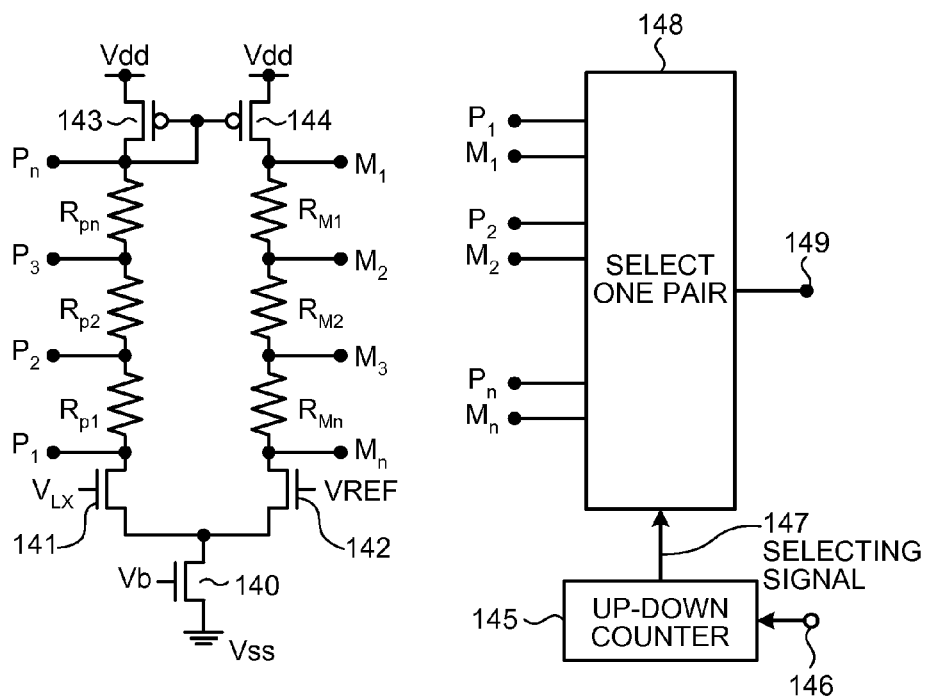
FIG. 14 is a diagram illustrating a second method of adjusting a threshold of the comparator.

As illustrated in FIG. 14, by employing a structure in which resistors (Rp1) to (Rpn) and (RM1) to (RMn) are connected between drains of the MOS transistors in the differential amplifier and a voltage on an optional point of the resistors is output differentially, it is possible to enlarge the adjustable range of the threshold of the differential amplifier. As illustrated in FIG. 14, connecting terminals of the respective resistors are provided with taps (P1) to (Pn) and (M1) to (Mn), and they are connected to input terminals (P1) to (Pn) and (M1) to (Mn) in a multiplexer (148), respectively. The output of the current direction detecting circuit (8) is supplied to a terminal (146) and data of an up-down counter (145) is changed correspondingly, and an output of the up-down counter (145) is supplied as a selecting signal (147) to the multiplexer (148). The multiplexer (148) outputs a differential output of a predetermined tap pair which is selected in response to the selecting signal (147). With the structure, it is possible to increase the adjustable range of the threshold. In the case in which the structure of the resistor is set to be the same as that in the embodiment illustrated in FIG. 13, the adjustable range of the threshold can be doubled.

Figure 15:
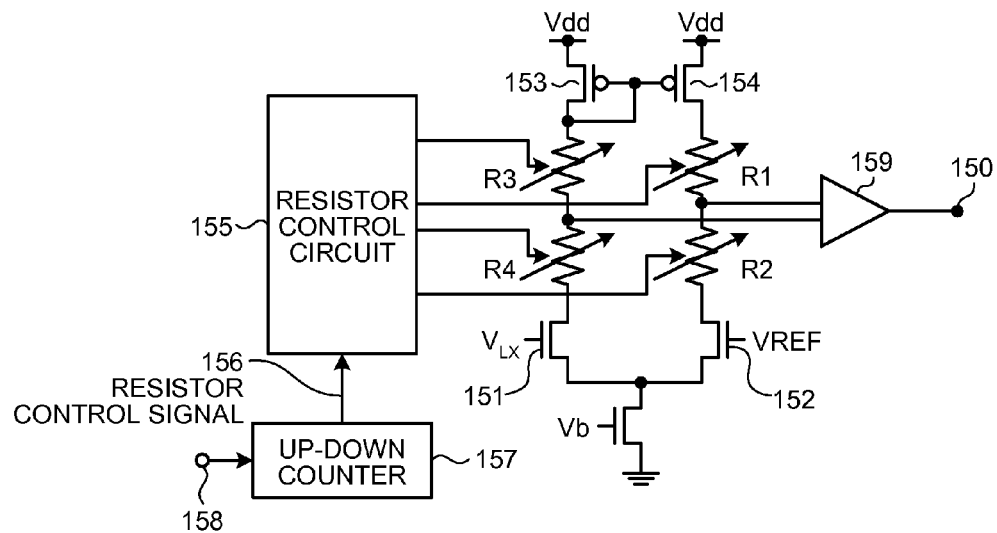
FIG. 15 is a diagram illustrating a third method of adjusting a threshold of the comparator.

FIG. 15 is a circuit diagram illustrating a generalized structure in which resistors (R1) to (R4) are connected between drains of input MOS transistors (151) and (152) and load MOS transistors (153) and (154) in the differential amplifier constituting the comparator and a differential output of a voltage in a predetermined position of the resistor is obtained from an output terminal (150) of a differential amplifier (159). By adjusting values of four variable resistors (R1) to (R4), it is possible to regulate an input voltage to the differential amplifier (159) and to regulate an output voltage obtained from the output terminal (150). Therefore, the threshold of the comparator can be adjusted. The variable resistors (R1) to (R4) are constituted by a series connection of parallel circuits in which a switch is connected in parallel with the resistor, for example. By turning ON/OFF the switch connected in parallel in response to a control signal sent from a resistor control circuit (155), it is possible to obtain a structure in which a resistance value is adjusted. A resistor control signal (156) corresponding to a control for quickening/delaying the timing for turning OFF the low-side switch (2) is supplied to the resistor control circuit (155). The output of the current direction detecting circuit (8) is supplied to a terminal (158) and data of the up-down counter (157) are changed correspondingly so that an output of the up-down counter (157) is supplied as the resistor control signal (156) to the resistor control circuit (155).

Figure 16:
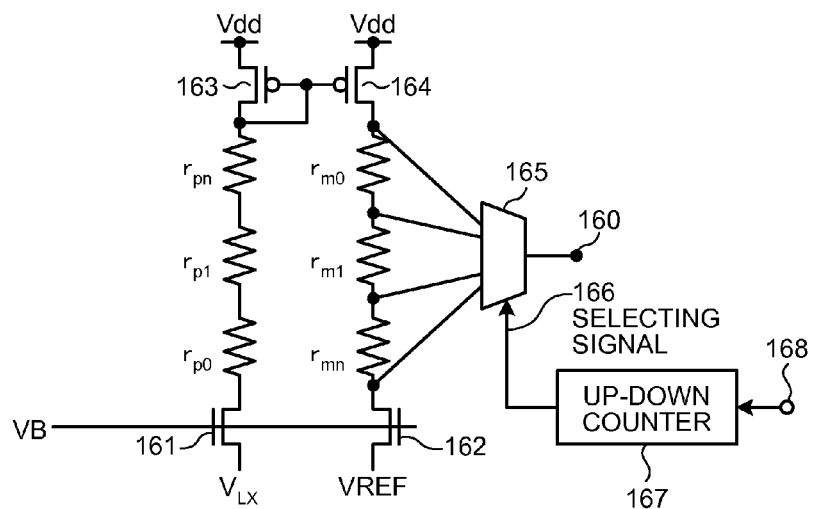
FIG. 16 is a diagram illustrating the first method of adjusting the threshold in the case in which the comparator is constituted by using a grounded-gate MOS transistor.

FIG. 16 illustrates an example in which a grounded-gate type comparator is used as the reverse flow detecting circuit (9). A predetermined bias voltage (VB) is applied to gates of N-type MOS transistors (161) and (162) constituting the comparator, an output voltage (VLX) is supplied to a source of the N-type MOS transistor (161), and a reference voltage (VREF) is supplied to a source of the N-type MOS transistor (162). With the structure, it is possible to obtain a comparator having a small input impedance. Consequently, a high speed operation can be acquired. By a multiplexer (165), there is selected any position in resistors (rm0), (rm1) and (rmn) connected between drains of a P-type MOS transistor (164) and an N-type MOS transistor (162) from which a voltage is to be output. Then, the voltage at the selected position is output from an output terminal (160) so that the threshold of the comparator can be adjusted. The output of the current direction detecting circuit (8) is supplied to a terminal (168) and data of an up-down counter (167) are changed correspondingly so that an output of the up-down counter (167) is supplied as a selecting signal (166) to the multiplexer (165).

Figure 17:
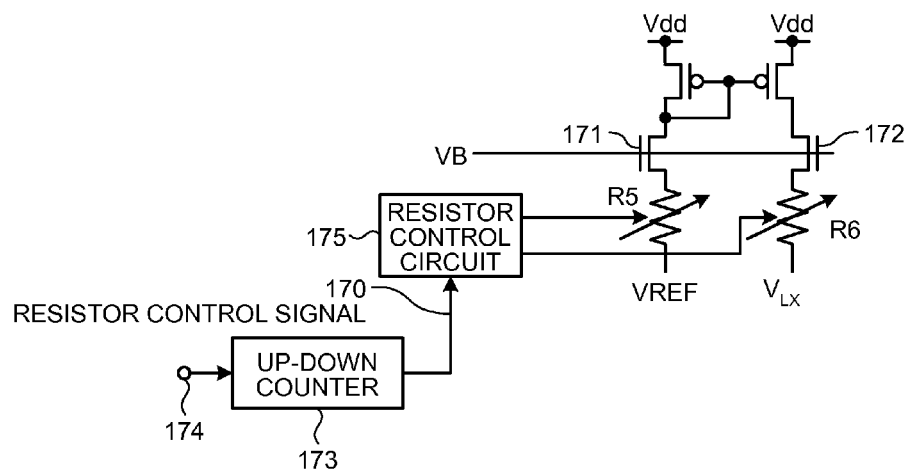
FIG. 17 is a diagram illustrating the second method of adjusting the threshold in the case in which the comparator is constituted by using the grounded-gate MOS transistor.

FIG. 17 illustrates a structure in which the reference voltage (VREF) and the output voltage (VLX) are supplied through the variable resistor to the respective sources of the grounded-gate MOS transistors constituting the comparator. By adjusting values of resistors (R5) and (R6) connected to respective sources of N-type MOS transistors (171) and (172) in response to a signal sent from a resistor control circuit (175), it is possible to adjust the threshold of the comparator. A resistor control signal (170) corresponding to a control for quickening/delaying the timing for turning OFF the low-side switch (2) is supplied to the resistor control circuit (175). The output of the current direction detecting circuit (8) is supplied to a terminal (174) and data of an up-down counter (173) are changed correspondingly so that an output of the up-down counter (173) is supplied as the resistor control signal (170) to the resistor control circuit (175).

Figure 18:
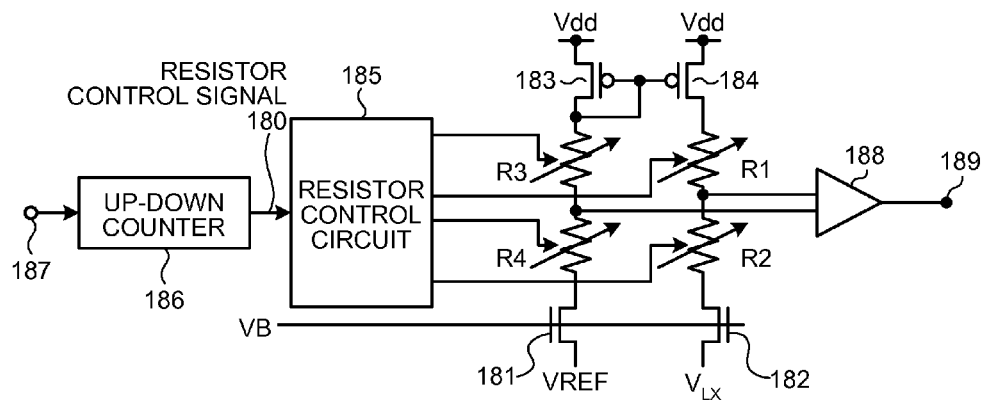
FIG. 18 is a diagram illustrating the third method of adjusting the threshold in the case in which the comparator is constituted by using the grounded-gate MOS transistor.

FIG. 18 illustrates a structure in which variable resistors (R1) to (R4) are connected between drains of grounded-gate N-type MOS transistors (181) and (182) and load MOS transistors (183) and (184) which constitute a comparator and voltages on connecting terminals of the variable resistors are output as differential outputs from a differential amplifier (188) to an output terminal (189). By varying resistance values of the variable resistors (R1) to (R4), the threshold of the comparator is adjusted. The output of the current direction detecting circuit (8) is supplied to a terminal (187) and data of an up-down counter 186 are changed correspondingly so that an output of the up-down counter (186) is supplied as a resistor control signal (180) to a resistor control circuit (185).

Figure 19:
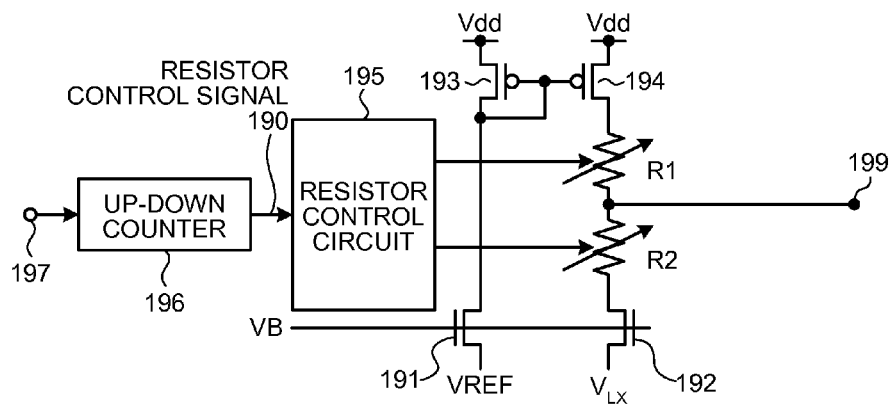
FIG. 19 is a diagram illustrating a fourth method of adjusting the threshold in the case in which the grounded-gate MOS transistor is used as an input transistor of the comparator.

As illustrated in FIG. 19, it is also possible to employ a structure in which a comparator is constituted by grounded-gate N-type MOS transistors (191) and (192) and load MOS transistors (193) and (194), and voltages on connecting terminals of the variable resistors (R1) and (R2) connected between drains of an input transistor (192) and a load transistor (194) are output from an output terminal (199). By regulating the resistance values of the resistors (R1) and (R2), it is possible to adjust the threshold of the comparator. The output of the current direction detecting circuit (8) is supplied to a terminal (197) and data of an up-down counter 196 are changed correspondingly so that an output of the up-down counter (196) is supplied as a resistor control signal (190) to a resistor control circuit (195).

Figure 20:
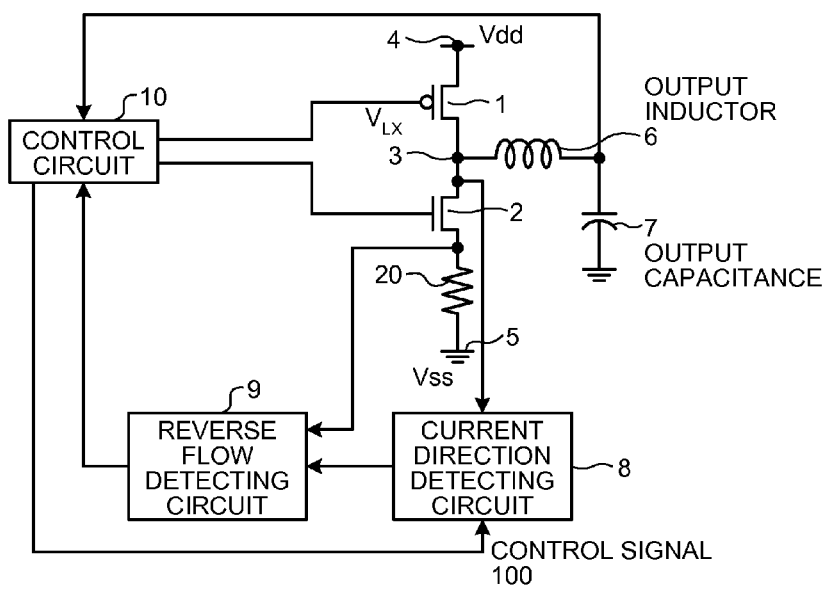
FIG. 20 is a diagram illustrating a synchronous rectification type power circuit according to a second embodiment in which a detecting position of a reverse flow detecting circuit is set to be a voltage of a source of a low-side switch.

FIG. 20 illustrates an embodiment employing a structure in which a resistor (20) is connected between a source of a low-side switch (2) and a low potential side power supply (Vss), and a voltage of the resistor (20) is detected by a reverse flow detecting circuit (9). A voltage corresponding to a direction of a current flowing to the low-side switch (2) is generated in the resistor (20). By detecting the voltage through the reverse flow detecting circuit (9), therefore, it is possible to detect the direction of the current.

Figure 21:
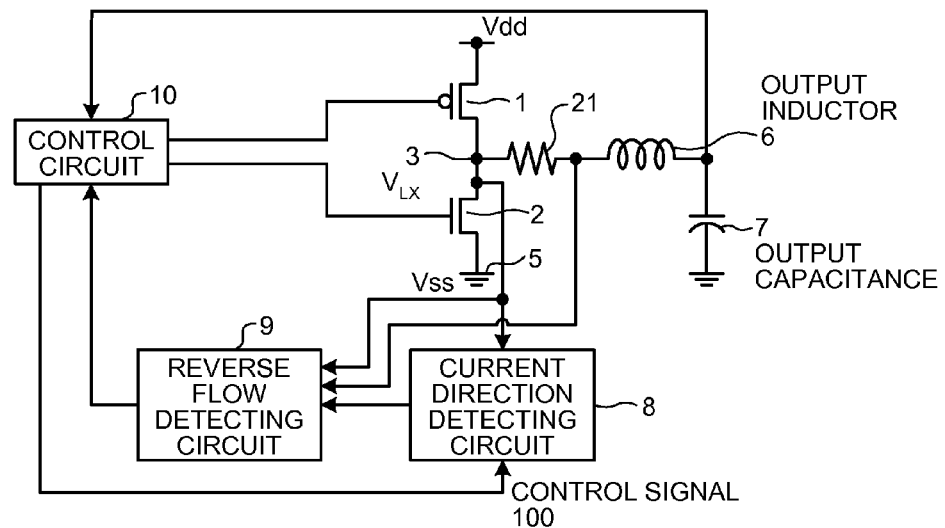
FIG. 21 is a diagram illustrating a synchronous rectification type power circuit according to a third embodiment in which a detecting position of a reverse flow detecting circuit is set to be a voltage of a resistor connected in series to an output inductor.

FIG. 21 illustrates an embodiment employing a structure in which a resistor (21) is connected between an output terminal (3) and an output inductor (6), and a voltage on both terminals of the resistor (21) is supplied to a reverse detecting circuit (9). A voltage corresponding to a direction of an inductor current is generated in the resistor (21). By detecting the voltage, therefore, it is possible to detect the direction of the current.

Figure 22:
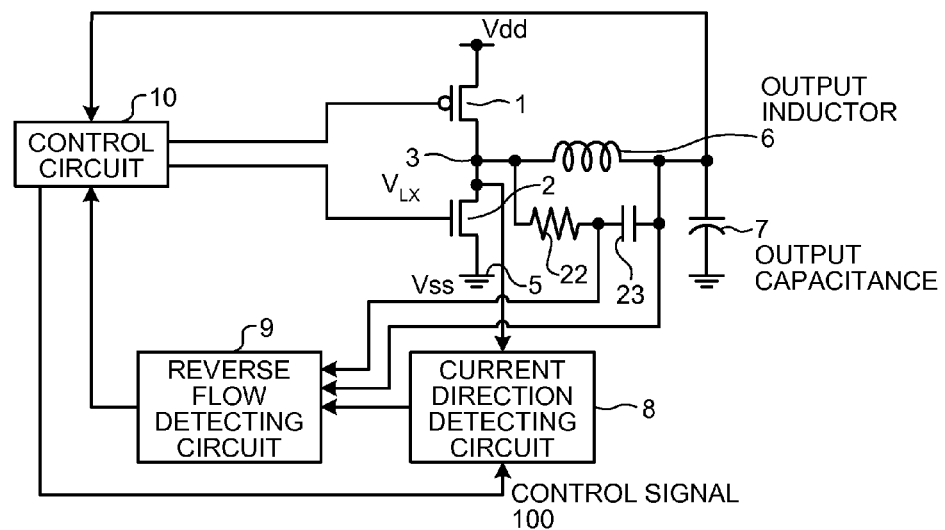
FIG. 22 is a diagram illustrating a synchronous rectification type power circuit according to a fourth embodiment in which a detection voltage of a reverse flow detecting circuit is set to be a voltage of a DCR emulation.
Figure 23:
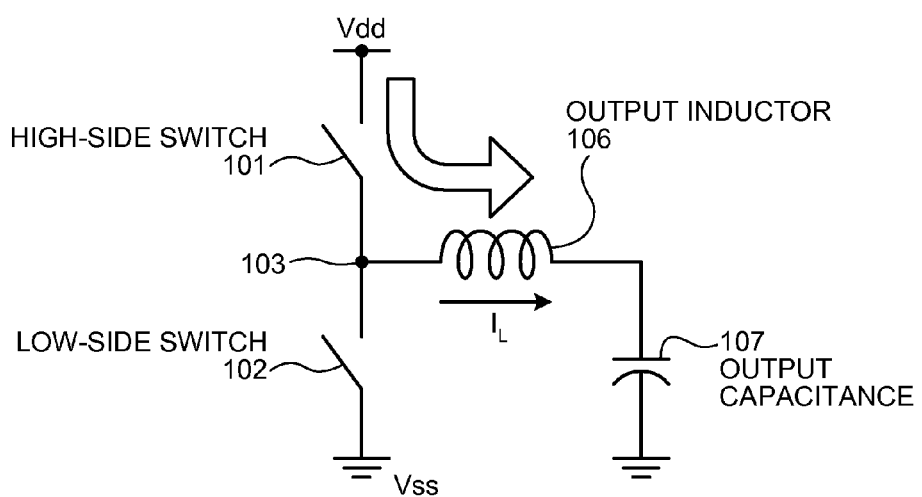
FIG. 23 is a diagram illustrating a general structure of the synchronous rectification type power circuit.

FIG. 22 illustrates an embodiment employing a structure in which a series circuit of a resistor (22) and a capacitor (23) is connected in parallel with an output inductor (6), voltages on connecting terminals of the output inductor (6) and an output capacitance (7) and voltages on connecting terminals of the resistor (22) and the capacitor (23) are supplied to a reverse flow detecting circuit (9). In the embodiment, a structure of a so-called DCR emulation is utilized to detect a current direction of an output inductor and it is possible to detect the current direction by detecting a voltage on both terminals of the capacitor (22).

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A synchronous rectification type power circuit comprising:
   a first power terminal to which a voltage on a high potential side is supplied;
   a second power terminal to which a voltage on a low potential side is supplied;
   an output terminal that outputs an output voltage to a load having an inductor and a capacitor;
   a first switch connected between the first power terminal and the output terminal;
   a second switch connected between the second power terminal and the output terminal;
   a control circuit that controls ON/OFF of the first and second switches; and
   a detecting circuit that compares the output voltage with a predetermined reference voltage for a predetermined period from a time when the second switch is turned OFF and that adjusts a circuit threshold based on a result of the comparison,
   wherein the control circuit delays a timing at which the second switch is turned OFF when the detecting circuit detects that the output voltage is lower than the predetermined reference voltage and quickens the timing at which the second switch is turned OFF when the detecting circuit detects that the output voltage is higher than the predetermined reference voltage.

2. The synchronous rectification type power circuit according to claim 1, wherein the detecting circuit includes:
   a current direction detecting circuit that compares the output voltage with the predetermined reference voltage for the predetermined period from the time when the second switch is turned OFF and that outputs an output, and
   a reverse flow detecting circuit that receives the output of the current direction detecting circuit and that has the circuit threshold,
   wherein the circuit threshold of the reverse flow detecting circuit is adjusted to delay the timing at which the second switch is turned OFF when the current direction detecting circuit detects that the output voltage is lower than the predetermined reference voltage and to quicken the timing at which the second switch is turned OFF when the current direction detecting circuit detects that the output voltage is higher than the predetermined reference voltage, for the predetermined period from the time when the second switch is turned OFF.

3. The synchronous rectification type power circuit according to claim 1, wherein the predetermined period is equal to or longer than at least one cycle of ringing generated in the output voltage and is equal to or shorter than a period achieved by dividing a duration period, for which the second switch is ON, by a square root of ten.

4. The synchronous rectification type power circuit according to claim 3, wherein the detecting circuit includes a comparator that inputs the output voltage and the predetermined reference voltage and a unit that changes a threshold of the comparator.

5. The synchronous rectification type power circuit according to claim 4, wherein the comparator includes:
first and second MOS transistors having gates which are connected in common and to which a predetermined bias voltage is applied, and
a load circuit connected to drains of the first and second MOS transistors, and the output voltage is applied to a source of the first MOS transistor and the predetermined reference voltage is applied to a source of the second MOS transistor.

6. The synchronous rectification type power circuit according to claim 5, wherein the comparator further includes:
third and fourth MOS transistors having gates which are connected in common and the voltage on the high potential side is applied to sources of the third and fourth MOS transistors,
a first resistor connected between the drain of the first MOS transistor and a drain of the third MOS transistor,
a second resistor connected between the drain of the second MOS transistor and a drain of the fourth MOS transistor,
a first tap provided in an optional place of the first resistor,
a second tap provided in an optional place of the second resistor, and
an output circuit that outputs a voltage difference between the first and second taps.

7. The synchronous rectification type power circuit according to claim 6, wherein at least one of the first and second resistors is a variable resistor.

8. The synchronous rectification type power circuit according to claim 1, further comprising a memory circuit that holds the result of the comparison till a timing at which the first switch is turned ON.

9. The synchronous rectification type power circuit according to claim 8, wherein the memory circuit includes a latch circuit that inputs the result of the comparison and a signal synchronized with the timing at which the first switch is turned ON.

10. The synchronous rectification type power circuit according to claim 1, wherein the predetermined reference voltage is the voltage on the low potential side which is supplied to the second power terminal.

11. The synchronous rectification type power circuit according to claim 1, wherein the detecting circuit includes a comparator that inputs the output voltage and the predetermined reference voltage and a unit that changes a threshold of the comparator.

12. The synchronous rectification type power circuit according to claim 11, wherein the comparator includes:
first and second MOS transistors having gates which are connected in common and to which a predetermined bias voltage is applied, and
a load circuit connected to drains of the first and second MOS transistors, and the output voltage is applied to a source of the first MOS transistor and the predetermined reference voltage is applied to a source of the second MOS transistor.

13. The synchronous rectification type power circuit according to claim 12, wherein the comparator further includes:
third and fourth MOS transistors having gates which are connected in common and the voltage on the high potential side is applied to sources of the third and fourth MOS transistors,
a first resistor connected between the drain of the first MOS transistor and a drain of the third MOS transistor,
a second resistor connected between the drain of the second MOS transistor and a drain of the fourth MOS transistor,
a first tap provided in an optional place of the first resistor,
a second tap provided in an optional place of the second resistor, and
an output circuit that outputs a voltage difference between the first and second taps.

14. The synchronous rectification type power circuit according to claim 13, wherein at least one of the first and second resistors is a variable resistor.

15. The synchronous rectification type power circuit according to claim 11, wherein the comparator includes first and second MOS transistors having sources which are connected in common and the output voltage and the predetermined reference voltage are supplied to respective gates of the first and second MOS transistors, and
a load circuit connected to drains of the first and second MOS transistors.

16. The synchronous rectification type power circuit according to claim 15, wherein the load circuit includes:
third and fourth MOS transistors having gates which are connected in common and the voltage on the high potential side is applied to sources of the third and fourth MOS transistors,
a first resistor connected between the drain of the first MOS transistor and a drain of the third MOS transistor,
a second resistor connected between the drain of the second MOS transistor and a drain of the fourth MOS transistor,
a plurality of taps provided on the first and second resistors, and
an output circuit that selects a pair of taps from the plurality of taps and that outputs a voltage difference between the selected pair of taps.

17. The synchronous rectification type power circuit according to claim 16, wherein the output circuit includes an up-down counter that outputs a selecting signal to select the pair of taps.

18. A method of adjusting a synchronous rectification type power circuit which includes a first power terminal to which a voltage on a high potential side is supplied, a second power terminal to which a voltage on a low potential side is supplied, an output terminal that outputs an output voltage to a load having an inductor and a capacitor, a first switch connected between the first power terminal and the output terminal, a second switch connected between the second power terminal and the output terminal, a control circuit that controls ON/OFF of the first and second switches; and a detecting circuit having a circuit threshold, the method comprising:

comparing the output voltage with a predetermined reference voltage for a predetermined period from a time when the second switch is turned OFF;

adjusting the circuit threshold of the detecting circuit based on a result of the comparison; and adjusting a timing at which the second switch is turned OFF through the control circuit, wherein the circuit threshold of the detecting circuit is adjusted to delay the timing at which the second switch is turned OFF when the detecting circuit detects that the output voltage is lower than the predetermined reference voltage and to quicken the timing at which the second switch is turned OFF when the detecting circuit detects that the output voltage is higher than the predetermined reference voltage.

19. The method of adjusting a synchronous rectification type power circuit according to claim 18, wherein the predetermined period is equal to or longer than at least one cycle of ringing generated in the output voltage and is equal to or shorter than a period achieved by dividing a duration period, for which the second switch is ON, by a square root of ten.

20. The method of adjusting a synchronous rectification type power circuit according to claim 18, wherein the detecting circuit includes a comparator that inputs the output voltage and the predetermined reference voltage, and that changes a threshold of the comparator, thereby adjusting the timing at which the second switch is turned off.

* * * * *